United States Patent
Bockhaus

(10) Patent No.: US 7,328,310 B2
(45) Date of Patent: Feb. 5, 2008

(54) METHOD AND SYSTEM FOR CACHE UTILIZATION BY LIMITING NUMBER OF PENDING CACHE LINE REQUESTS

(75) Inventor: John William Bockhaus, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 11/049,454

(22) Filed: Feb. 2, 2005

(65) Prior Publication Data

US 2006/0174062 A1 Aug. 3, 2006

(51) Int. Cl.
*G06F 12/00* (2006.01)
*G06F 13/00* (2006.01)

(52) U.S. Cl. .................. 711/118; 711/100; 711/154

(58) Field of Classification Search ............. 711/100, 711/118, 154; 710/22, 28
See application file for complete search history.

(56) References Cited

U.S. PATENT DOCUMENTS

| | | | | |
|---|---|---|---|---|
| 5,263,142 A | * | 11/1993 | Watkins et al. | 710/22 |
| 5,522,054 A | * | 5/1996 | Gunlock et al. | 711/112 |
| 5,796,979 A | * | 8/1998 | Arimilli et al. | 711/142 |
| 5,802,576 A | | 9/1998 | Tzeng et al. | |
| 6,160,562 A | * | 12/2000 | Chin et al. | 345/520 |
| 6,338,119 B1 | | 1/2002 | Anderson et al. | |
| 6,574,682 B1 | | 6/2003 | Chan | |
| 6,629,188 B1 | * | 9/2003 | Minkin et al. | 711/3 |
| 6,636,906 B1 | | 10/2003 | Sharma et al. | |
| 6,647,469 B1 | | 11/2003 | Sharma et al. | |
| 6,662,272 B2 | | 12/2003 | Olarig et al. | |
| 6,678,795 B1 | * | 1/2004 | Moreno et al. | 711/137 |
| 6,701,387 B1 | * | 3/2004 | Pannel et al. | 710/22 |
| 6,711,650 B1 | | 3/2004 | Bohrer et al. | |
| 6,718,454 B1 | | 4/2004 | Ebner et al. | |
| 6,959,363 B2 | * | 10/2005 | Southwell et al. | 711/137 |
| 2003/0105929 A1 | | 6/2003 | Ebner et al. | |
| 2003/0204662 A1 | * | 10/2003 | Smith et al. | 710/310 |
| 2004/0193771 A1 | | 9/2004 | Ebner | |

* cited by examiner

*Primary Examiner*—Tuan V. Thai

(57) ABSTRACT

System and method for memory utilization in a computer system are described. In one embodiment, the method comprises, responsive to receipt of a new cache line-sized memory request, determining whether a number of pending requests is less than a fetch limit that is equal to or less than a number of cache lines of a cache memory; and responsive to a determination that the number of pending requests is less than the fetch limit, performing an arbitration among all of the pending requests, including the new cache line-sized memory request.

24 Claims, 6 Drawing Sheets

METHOD AND SYSTEM FOR CACHE UTILIZATION BY LIMITING NUMBER OF PENDING CACHE LINE REQUESTS

CROSS-REFERENCE TO RELATED APPLICATION(S)

This application discloses subject matter related to the subject matter disclosed in the following commonly owned co-pending U.S. patent applications: (i) "METHOD AND SYSTEM FOR CACHE UTILIZATION BY LIMITING I/O CARD PREFETCH REQUESTS," application Ser. No. 11/049,024; (ii) "METHOD AND SYSTEM FOR PREVENTING CACHE LINES FROM BEING FLUSHED UNTIL DATA STORED THEREIN IS USED," application Ser. No. 11/049.011; and (iii) "METHOD AND SYSTEM FOR CACHE UTILIZATION BY PREFETCHING FOR MULTIPLE DMA READS," application Ser. No. 11/048, 830; all of which were filed on Feb. 2, 2005 and are incorporated by reference herein.

BACKGROUND

Today's processors are more powerful and faster than ever. As a result, even memory access times, typically measured in tens of nanoseconds, can be an impediment to a processor's running at full speed. Generally, the CPU time of a processor is the sum of the clock cycles used for executing instructions and the clock cycles used for memory access. While modern processors have improved greatly in terms of instruction execution time, the access times of reasonably-priced memory devices have not similarly improved.

A common method of compensating for memory access latency is memory caching. Memory caching takes advantage of the inverse relationship between the capacity and the speed of a memory device; that is, a larger (in terms of storage capacity) memory device is generally slower than a smaller memory device. Additionally, slower memories are less expensive, and are therefore more suitable for use as a portion of mass storage, than are more expensive, smaller, and faster memories.

In a caching system, memory is arranged in a hierarchical order of different speeds, sizes, and costs. For example, a small, fast memory, usually referred to as a "cache memory", is typically placed between a processor and a larger, but slower, main memory. The cache memory has the capacity to store only a small subset of the data stored in the main memory. The processor needs only a certain, small amount of the data from the main memory to execute individual instructions for a particular application. The subset of memory is chosen based on an immediate relevance based on well-known temporal and spacial locality theories. This is analogous to borrowing only a few books at a time from a large collection of books in a library to carry out a large research project. Just as research may be as effective and even more efficient if only a few books at a time are borrowed, processing of a program is efficient if a small portion of the entire data stored in main memory is selected and stored in the cache memory at any given time.

An input/output ("I/O") cache memory located between main memory and an I/O controller ("IOC") will likely have different requirements than a processor cache memory, as it will typically be required to store more status information for each line of data, or "cache line", than a processor cache memory. In particular, an I/O cache will need to keep track of the identity of the particular one of a variety of I/O devices requesting access to and/or having ownership of a cache line. The identity of the current requester/owner of the cache line may be used, for example, to provide fair access. Moreover, an I/O device may write to only a small portion of a cache line. Thus, an I/O cache memory may be required to store status bits indicative of which part of the cache line has been written or fetched. Additionally, one or more bits will be used to indicate line state of the corresponding cache line; e.g., private, current, allocated, clean, dirty, being fetched, etc. Still further, in an I/O cache, there is no temporal locality; that is, the data is used just once. As a result, an I/O cache does not need to be extremely large and functions more like a buffer to hold data as it is transferred from main memory to the I/O device and vice versa.

As I/O cards become faster and more complex, they can issue a greater number of direct memory access ("DMA") requests and have more DMA requests pending at one time. The IOC, which receives these DMA requests from I/O cards and breaks up each into one or more cache line-sized requests to main memory, generally has a cache to hold the data that is fetched from main memory in response to each DMA request, but the amount of data that can be stored in the cache is fixed in size and is a scarce resource on the IOC chip. When the IOC attempts to access a memory location in response to a DMA request from an I/O card, it first searches its cache to determine whether it already has a copy of the requested data stored therein. If not, the IOC attempts to obtain a copy of the data from main memory.

As previously indicated, when an IOC fetches data from main memory in response to a DMA request from an I/O card, it needs to put that data into its cache when the data is delivered from memory. If the cache is full (i.e., if there are no empty cache lines available), the new data may displace data stored in the cache that has not yet been used. This results in a performance loss, as the data that is displaced must subsequently be refetched from main memory.

I/O transfers tend to be long bursts of data that are linear and sequential in fashion. Prefetch data techniques allow I/O subsystems to request data stored in memory prior to an I/O device's need for the data. By prefetching data ahead of data consumption by the device, data can be continuously sent to the device without interruption, thereby enhancing I/O system performance. The amount of data that is prefetched in this manner for a single DMA transaction is referred to as "prefetch depth." The "deeper" the prefetch, the more data that is fetched before the data from the first request has been consumed.

However, some DMA requests, in particular, Peripheral Component Interconnect ("PCI") DMA reads, are speculative by nature. This is due to the fact that only the beginning address, but not the length, of the data is specified in a PCI DMA read request. Hence, a PCI DMA read will use prefetch operations to fetch data that the IOC "guesstimates" that the I/O device will require before that data is actually requested by the device. In contrast, PCIX standard DMA reads specify both a starting address and a length of the data to be read and are therefore nonspeculative. In one prior art embodiment, a prefetch machine is used to predict future requests based on a current request and keeps track of memory requests that have already been initiated and queued.

In a worst case scenario, the IOC could issue prefetch requests to main memory for every cache line of every pending DMA transaction from every IO card. In this worst case scenario, the capacity of a typical IOC cache would be insufficient to accommodate all of the requested cache lines.

Alternatively, the cache could be enlarged, resulting in a IOC cache that is much bigger than it needs to be under normal circumstances.

In cases in which the number of requests issued is greater than the size of the cache, there will be contention for cache lines. In one prior art embodiment, a cache replacement algorithm ("CRA") is implemented by the IOC to select which cache line(s) to displace, or "flush". It will be recognized that CRAs that are random may displace cache lines that have not yet been used. Other CRAs flush old or unused cache lines first, as there is a greater likelihood that those lines will not be needed; however, such algorithms give no weight to whether a cache line contains speculative, as opposed to nonspeculative, data when considering whether to flush a particular line.

SUMMARY

One embodiment is directed to a memory utilization method in a computer system. The method comprises, responsive to receipt of a new cache line-sized memory request, determining whether a number of pending requests is less than a fetch limit that is equal to or less than a number of cache lines of a cache memory; and responsive to a determination that the number of pending requests is less than the fetch limit, performing an arbitration among all of the pending requests, including the new cache line-sized memory request.

Another embodiment is directed to a memory utilization method in a computer system. The method comprises, responsive to receipt of a new DMA transaction, dividing the new DMA transaction into a number of new cache line-sized memory requests and determining whether a number of pending memory requests is less than at least a subset of the total number of cache lines of a cache memory; and responsive to a determination that the number of pending memory requests is less than at least a subset of the total number of cache lines of the cache memory, performing an arbitration among all pending DMA transactions, including the new DMA transaction.

Another embodiment is directed to a system for performing DMA transactions in a computer. The system comprises cache means for storing data in connection with DMA transactions; means responsive to receipt of a new memory request for determining whether a number of pending requests is less than a fetch limit, wherein the fetch limit is equal to or less than a number of lines of the cache means; and means responsive to a determination that the number of pending requests is less than the fetch limit for performing an arbitration among all of the pending requests, including the new memory request.

Another embodiment is directed to a memory utilization system in a computer. The system comprises means responsive to receipt of a new DMA transaction for dividing the new DMA transaction into a number of new cache line-sized memory requests; means for determining whether a number of pending memory requests is less than at least a subset of the total number of cache lines of a cache memory; and means responsive to a determination that the number of pending memory requests is less than at least a subset of the total number of cache lines of the cache memory for performing an arbitration among all pending DMA transactions, including the new DMA transaction.

Another embodiment is directed to a computer-readable medium operable with a computer for performing DMA transactions in a computer. The medium has stored thereon instructions executable by the computer responsive to receipt of a new memory request for determining whether a number of pending requests is less than a fetch limit, wherein the fetch limit is equal to or less than a number of lines of a cache means; and instructions executable by the computer responsive to a determination that the number of pending requests is less than the fetch limit for performing an arbitration among all of the pending requests, including the new memory request.

DETAILED DESCRIPTION OF THE DRAWINGS

Figure 1A:
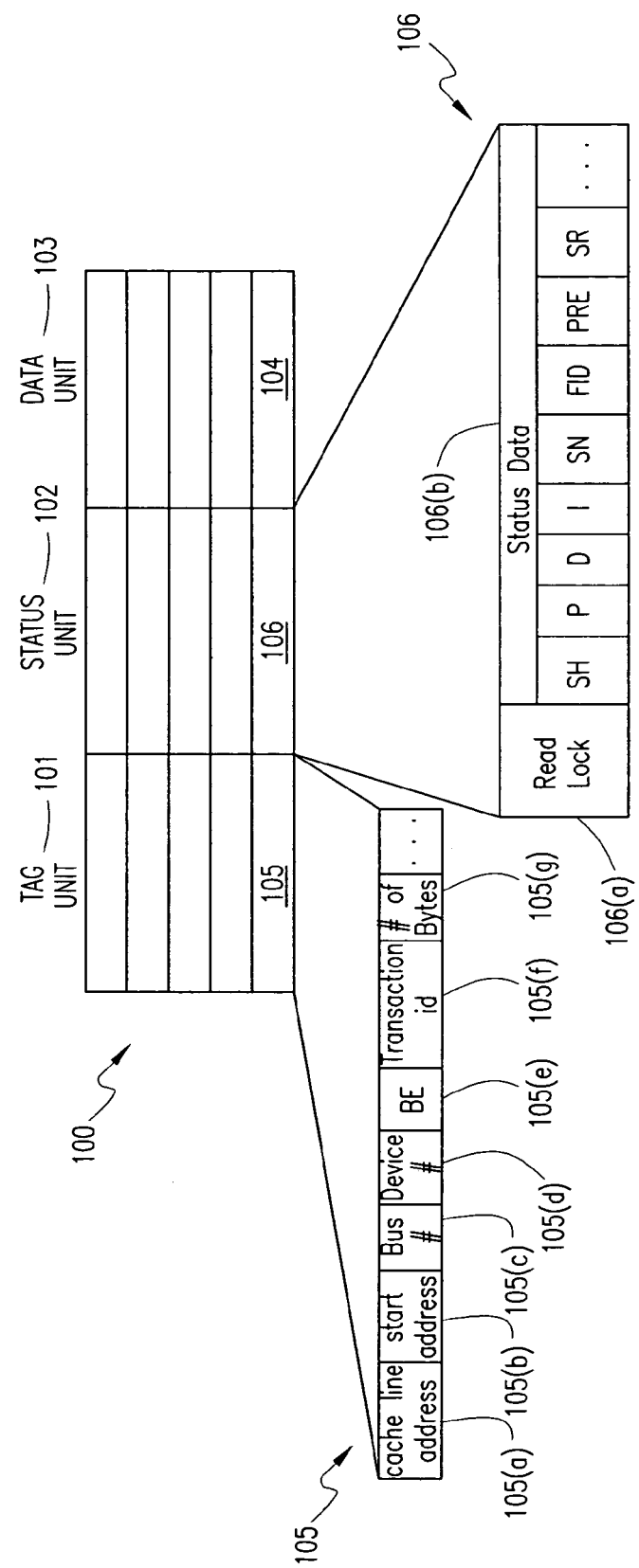
FIG. 1A is a block diagram of an exemplary I/O cache.

In the drawings, like or similar elements are designated with identical reference numerals throughout the several views thereof, and the various elements depicted are not necessarily drawn to scale.

FIG. 1A is a block diagram of an exemplary I/O cache 100. As illustrated in FIG. 1A, the cache 100 comprises a tag unit 101, a status unit 102, and a data unit 103. The data unit 103 comprises a number of cache lines, such as the cache line 104, each of which is preferably 128 bytes long. Each cache line has associated therewith a tag line that is stored in the tag unit 101, such as the tag line 105, and a status line that is stored in the status unit 102, such as the status line 106.

As shown in FIG. 1A, each tag line of the tag unit 102 can include the following data:

cache line address 105(a) the address of the associated cache line in the data unit 103;

start address 105(b) the address of the initial block of data of the associated cache line;

bus # 105(c) identifies the PCI bus requesting the cache line;

device # 105(d) identifies the device requesting the cache line data;

byte enable 105(e) identifies the bytes to be transferred and the data paths to be used to transfer the data;

transaction ID 105(f) identifies a transaction initiating the DMA read request; and number of bytes 105(g) indicates the number of bytes subject to the read request.

The tag unit 101 stores all of the above-identified information in part to identify the originator and the originating request.

As also shown in FIG. 1A, each status line of the status unit 102 can include the following data:

read lock 106(a) a variable indicating that an I/O device has requested the corresponding cache line and the cache line has not yet been returned to the requesting device;

status data 106(b) status data can indicate one or more of the following cache line states:

shared ("SH") the cache line is present in the cache and contains the same value as in main memory;

private ("P") the cache line is present in the cache and the cache has read and write access to the cache line;

dirty ("D") the cache has the data marked private and the value has been updated only in the cache;

invalid ("I") the associated cache line does not represent the current value of the data;

snapshot ("SN") the associated cache line represents a value that was current at the time a read request was made and was snooped thereafter;

fetch-in-progress ("FIP") the associated cache line is being fetched;

prefetch ("PRE") the cache line is being prefetched.

Figure 1B:
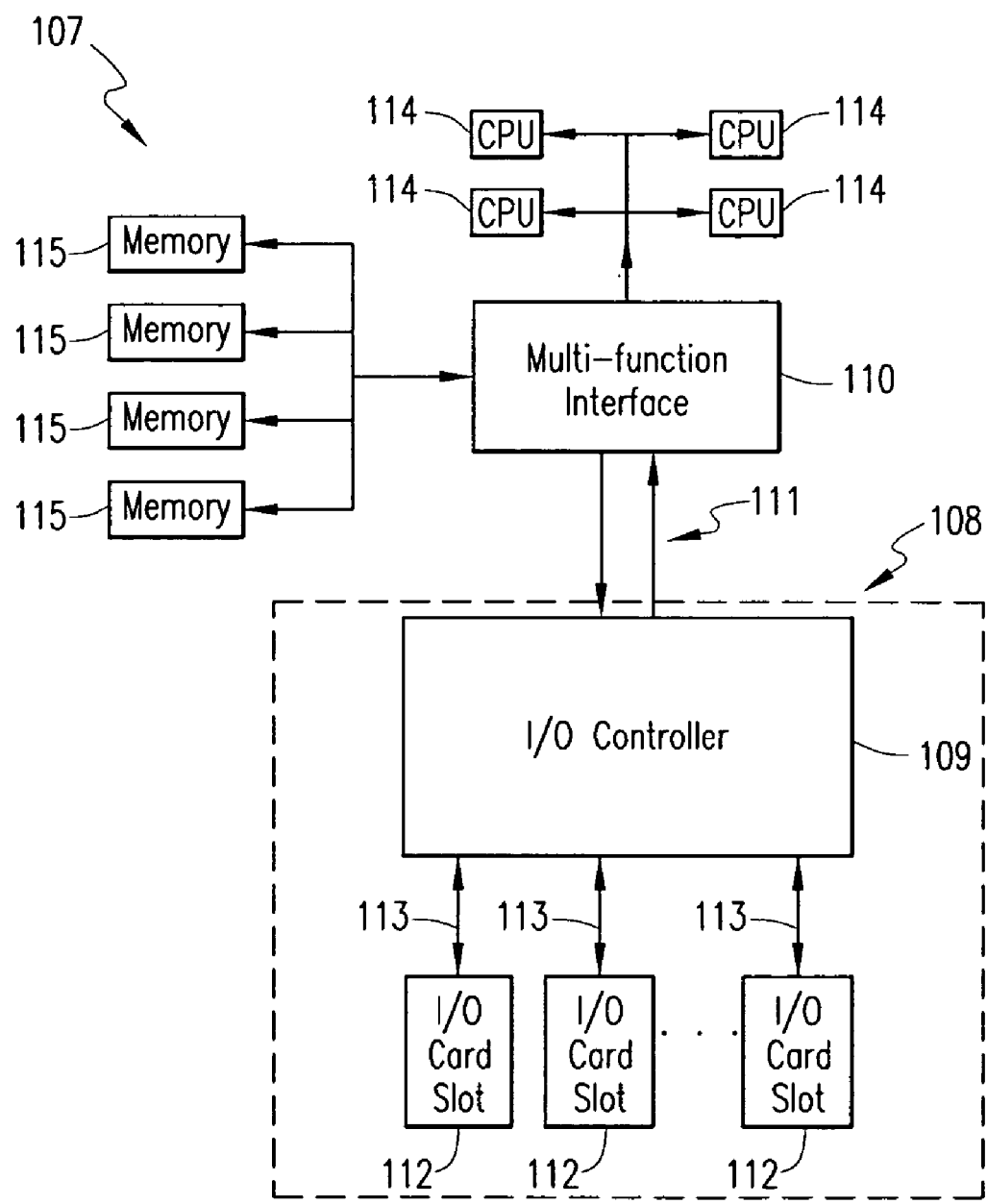
FIG. 1B is a block diagram of a computer system in accordance with one embodiment.

FIG. 1B is a block diagram of a computer system 107 according to one embodiment. As illustrated in FIG. 1B, the computer system 107 includes an I/O subsystem 108 comprising at least one IOC 109 that communicates with a multi-function interface 110 via a high-speed link 111. Each of a plurality of I/O card slots 112 for accommodating I/O cards is connected to the IOC 109 via an I/O bus 113. The multi-function interface 110 provides inter alia an interface to a number of CPUs 114 and main memory 115.

Figure 1C:
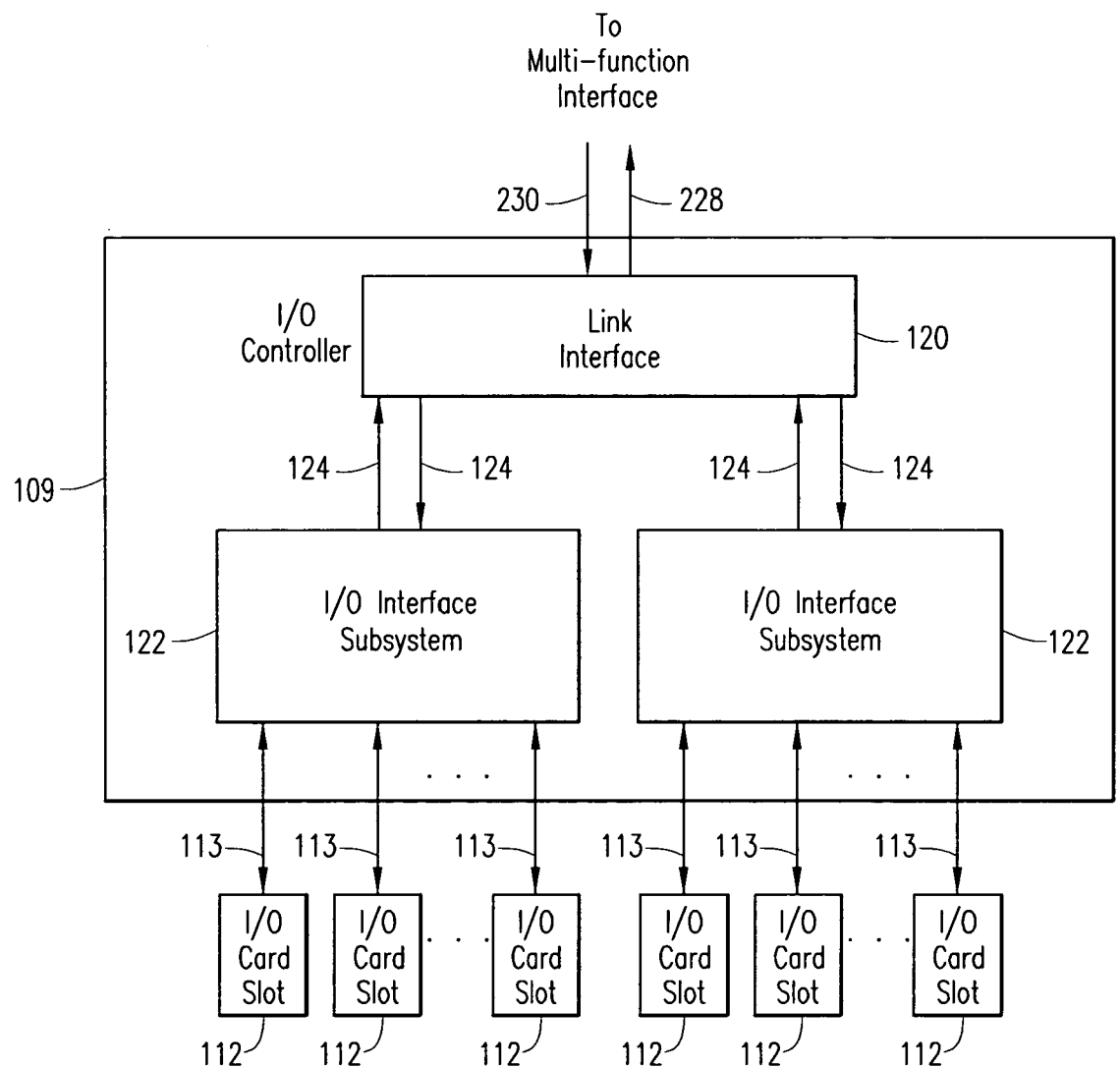
FIG. 1C is a block diagram of an I/O controller of the computer system of FIG. 1B.

FIG. 1C is a high level block diagram of the IOC 109. A link interface block 120 connects to one or more I/O interface subsystems 122 via internal, unidirectional buses, represented in FIG. 1C by buses 124. The link interface block 120 further connects to the multi-function interface 110 via the high speed link 111, which, as shown in FIG. 1C, comprises an inbound (from the perspective of the interface 110) bus 228 and an outbound (again, from the perspective of the interface 110) bus 230.

Figure 2:
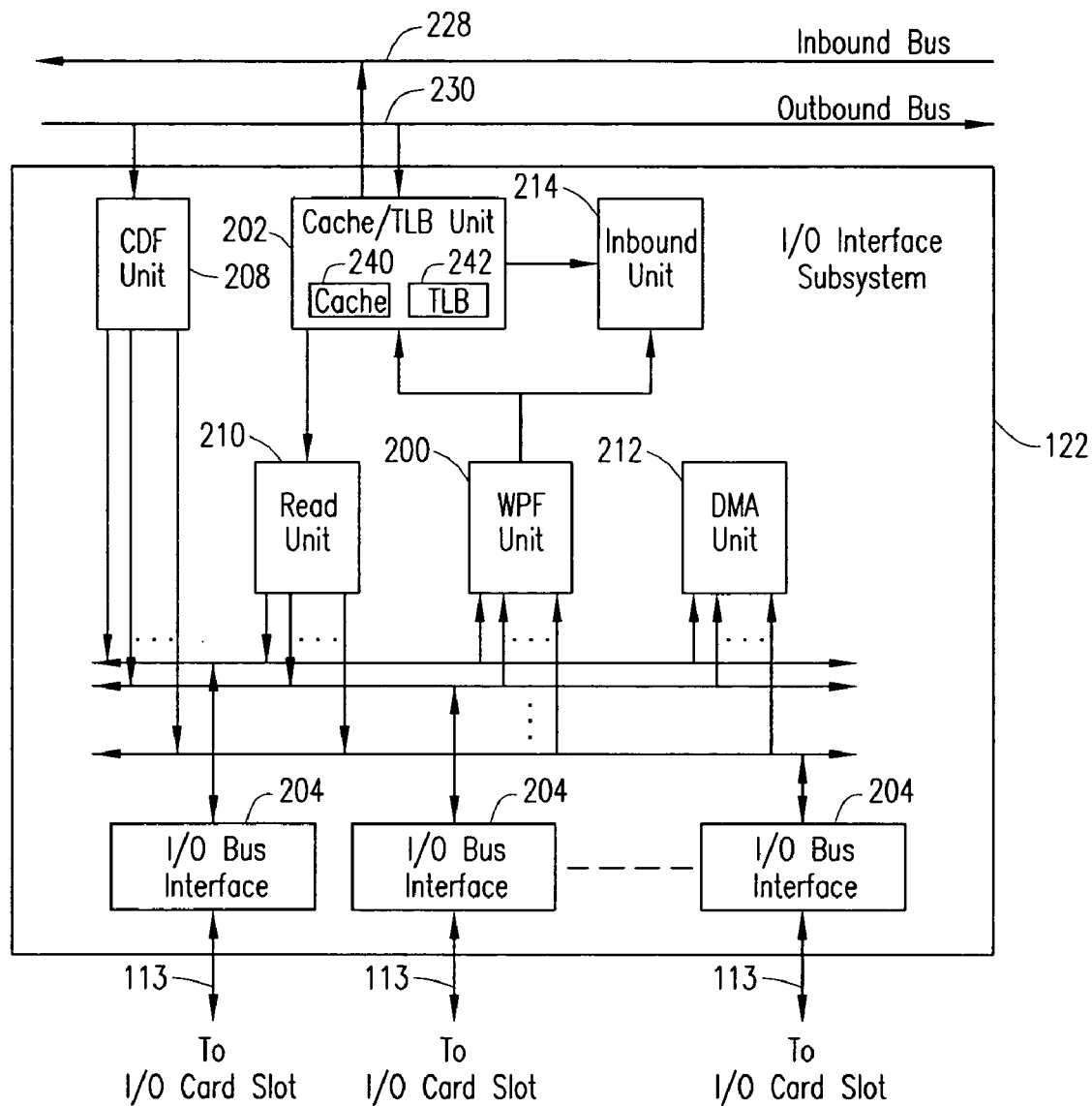
FIG. 2 is a block diagram of an I/O interface subsystem of the I/O controller of FIG. 1C.

FIG. 2 is a more detailed block diagram of one of the I/O interface subsystems 122. The I/O interface subsystem 122 includes a write-posting FIFO ("WPF") unit 200, a cache and Translation Lookaside Buffer ("Cache/TLB") unit 202, and a plurality of I/O bus interfaces 204. Each of the I/O bus interfaces 204 provides an interface between one of the I/O buses 113 and the I/O interface subsystem 122. The I/O interface subsystem 122 further includes a Control-Data FIFO ("CDF") unit 208, a Read unit 210, and a DMA unit 212, for purposes that will be described in greater detail below.

The Cache/TLB unit 202 includes a cache 240 and a TLB 242. The cache 240 contains 96 fully-associative entries, each 128-bytes wide. In one embodiment, a substantial amount of status information is available on each cache line including line state, bytes written, number of writes outstanding to line, which I/O bus the line is bound to, and more. For example, it will be recognized that the cache embodiment of FIG. 1A may be used in some implementations of the I/O interface subsystem 122 for purposes of the present disclosure.

Figure 3:
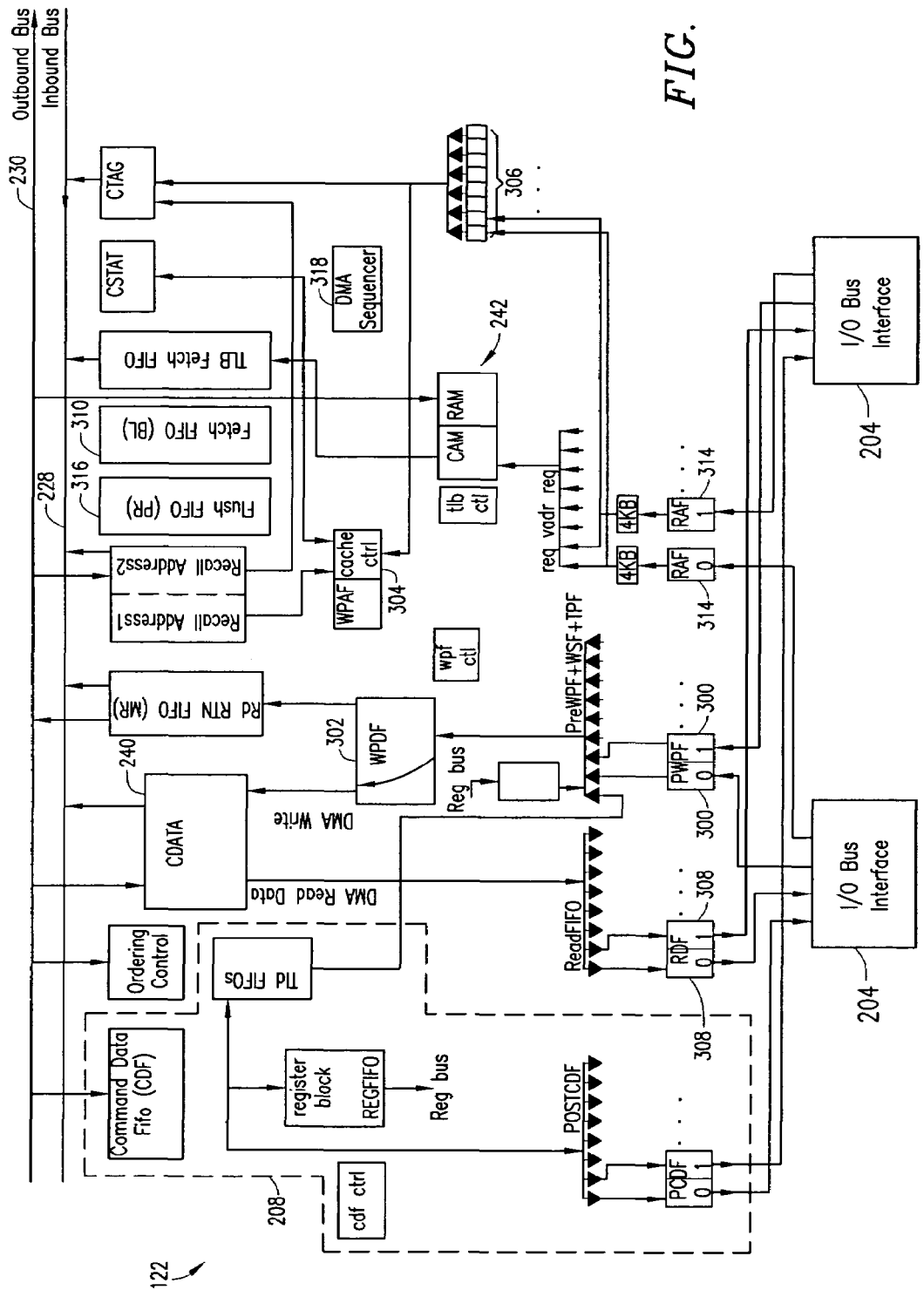
FIG. 3 is a more detailed block diagram of the I/O interface subsystem of FIG. 2.

As used herein, "bottom end" will be used to refer to the end of a device or unit nearest the I/O card slots 112, while "upper end" will be used to refer to the end of a device or unit nearest the multi-function interface 110. Accordingly, in one embodiment, the bottom end of each of the CDF unit 208, Read unit 210, WPF unit 200, and DMA unit 212, includes a separate structure for each of the I/O bus interfaces 204 such that none of the I/O buses 113 has to contend with any of the others to get buffered into the IOC 109. All arbitration between the I/O buses 113 occurs inside of each of the units 200, 208, 210, and 212, to coalesce or divide traffic into the single resources higher up (i.e., closer to the multi-function interface 110). For instance, a DMA write address will come up through one of the I/O bus interfaces 204 and be stored in a corresponding address register (not shown) in the DMA unit 212. Referring now also to FIG. 3, data following the address will go into a dedicated one of a plurality of pre-WPFs 300 in the WPF unit 200. Each pre-WPF 300 is hardwired to a corresponding one of the I/O buses 113. When the data reaches the head of the pre-WPF 300, arbitration occurs among all of the pre-WPFs, a cache entry address ("CEA") is assigned to the write, and the data is forwarded from the pre-WPF into a main write-posting data FIFO ("WPDF") 302.

FIFOs that interface with inbound and outbound buses 228, 230, are single FIFOs and are not divided by I/O buses 113. FIFOs in the inbound unit 214 handle various functions including TLB miss reads and fetches and flushes from the cache 240.

The IOC 109 is the target for all PCI memory read transactions to main memory 115. A PCI virtual address will be translated into a 44-bit physical address by the TLB 242, if enabled for that address, and then forwarded to a cache controller 304 through request physical address registers 306. If there is a hit, meaning that the requested data is already in the cache 240, the data will be immediately returned to the requesting I/O bus though one of a plurality of Read Data FIFOs 308 dedicated thereto. If there is no hit, an empty cache line entry will be allocated to store the data and an appropriate entry will be made in a Fetch FIFO 310. If prefetch hints indicate that additional data needs to be fetched, the new addresses will be generated and fetched from main memory in a similar manner.

For fixed-length PCIX reads, up to eight DMA read/write requests can be in each of a plurality of a Request Address FIFOs ("RAFs") 314. To minimize the start-up latency on DMA reads, there is a pre-read function that begins processing the next read in each RAF 314 before the current read has completed. This includes translating the address using the TLB 242 and issuing fetches for the read. When the current DMA read has completed its prefetches, if there is another read behind it in the RAF 314, prefetches will be issued for that read. The original read stream continues; when it completes, the first few lines of the next stream should already be in the cache 240.

In general, the cache 240 stays coherent, allowing multiple DMA sub-line reads to reference the same fetched copy of a line. Forward progress during reads is guaranteed by "locking" a cache entry that has been fetched until it is accessed from the I/O buses 113. A locked entry does not mean that ownership for the cache line is locked; it simply means that a spot is reserved in the cache 240 for that data until it is accessed from PCI. Ownership of the line could still be lost due to a recall. Only the same PCI entity that originally requested the data will be able to access it. Any additional read accesses to that cache line by another PCI entity would be retried until the original PCI entity has read the data, at which point the cache line is unlocked. A line is considered fetched when it is specifically requested by a PCI transaction, even if the transaction was retried. A line is considered pre-fetched if it is requested by the cache block as the result of hint bits associated with a fetched line. Cache lines that are prefetched are not locked and could be flushed before they are actually used if the cache is thrashing. The PCI specification guarantees that a master whose transaction is retried will eventually repeat the transaction. The cache size has been selected to ensure that a locked cache line is not a performance issue and does not contribute to the starvation of some PCI devices.

The IOC 109 maintains a timeout bit on each locked cache line. This bit is cleared whenever the corresponding cache line is accessed and is flipped each time a lock_timeout timer expires. Upon transition of the timeout bit from one to zero, the line is flushed. This is a safeguard to prevent a cache line from being locked indefinitely.

There is a bit for each line that indicates that a fetch is in progress with respect to that line. If read data returns on the link for a line that does not have the fetch-in-progress bit set, the data will not be written into the cache for that transaction and an error will be logged. There is also a timer on each fetch in progress to prevent a line from becoming locked indefinitely.

With regard to DMA writes, if the entry at the head of the WPDF 302 is a write to memory, a cache line has already been reserved for the data. A write-posting address FIFO ("WPAF") holds the CEA value. The status of the cache line indicated by the CEA is checked to determine whether ownership of the line has been obtained. Once ownership is received, the data is copied from the WPDF 302 into the cache 240. The status bits of the cache line are then updated. If ownership has not yet been received, the status of the cache line is monitored until ownership is obtained, at which point the write is performed.

To process a new DMA request, the cache 240 must have available lines to make requests from main memory. However, it is counterproductive to flush data that has not been used yet just to make room for the next DMA request. An embodiment described herein minimizes the frequency with which a cache replacement algorithm ("CRA") is employed. In particular, by employing a fetch limit, as described herein, the cache 240 will wait for the data to be used and the line to be automatically flushed thereafter. Subsequently, the cache 240 will start working on the next DMA request. In this manner, the CRA needs only to be used if the lines in the cache are not automatically flushed after the data stored therein has been used. If the CRA is employed and makes a determination to flush a line, the cache line status will be checked and the CEA written to a flush FIFO 316 to make room for the next transaction.

Lines may also be flushed automatically and there are separate auto-flush hint mechanisms for both reads and writes. For connected DMA reads, there are two different types of auto flush. In the default case, a flush occurs when the last byte of the cache line is actually read on PCI. The second type is an aggressive auto-flush mode that can be enabled by setting a hint bit with the transaction. In this mode, the line is flushed from the cache 240 as soon as the last byte is transferred to the appropriate one of the RDFs 308. For fixed-length DMA reads, the aggressive auto-flush mode is always used.

There are also two types of auto-flushes for writes. The default mode causes a line to be flushed with the last byte written to a cache line from the WPDF 302. The second mode, enabled via a hint bit with the transaction, is an aggressive auto-flush. In this mode, the line is flushed from the cache 240 as soon as there are no more outstanding writes to that cache line in the WPDF 302.

Continuing to refer to FIG. 3, each of the I/O buses 113 can have up to eight requests queued up in its RAF 314. A DMA sequencer 318 of the DMA unit 212 can be working on one read, one write, and one pre-read for each I/O bus. Each read/write can be for a block of memory up to 4 KB. A pre-read is started only when the current read is almost completed. A write can pass a read if the read is not making progress.

DMA latency is hidden as follows. For DMA reads, prefetching is used to minimize the latency seen by the I/O cards. A hint indicating prefetch depth is provided with the transaction and is defined by software. As previously indicated, for a DMA write, the write data goes from the I/O bus into a corresponding one of the pre-WPFs 300 and then into the WPDF 302. The FIFOs 300,302, are large enough to hide some of the latency associated with a DMA write request.

Figure 4:
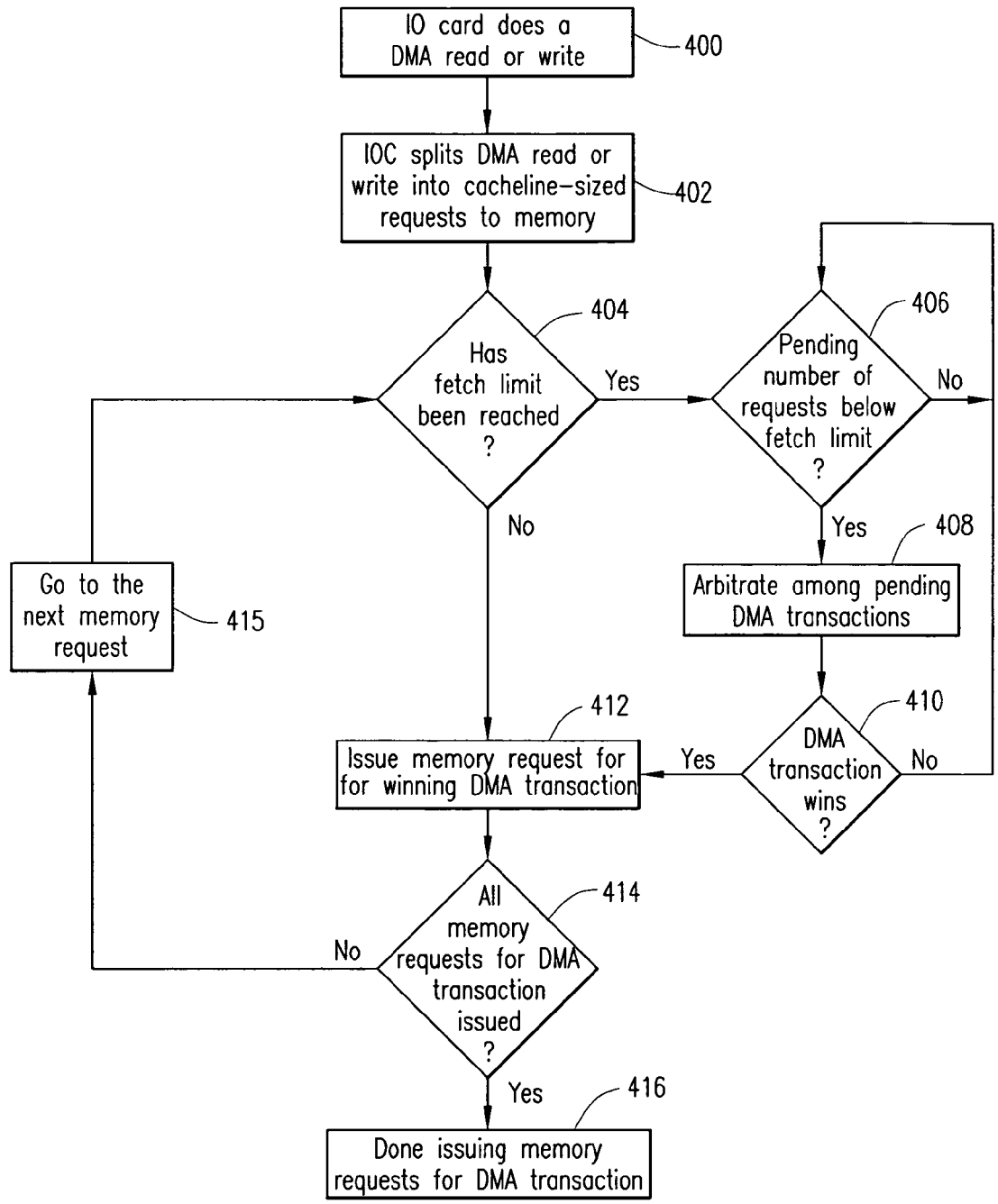
FIG. 4 is a flowchart illustrating operation of a method of one embodiment for utilizing the cache of the I/O controller of FIG. 1C.

FIG. 4 is a flowchart of the operation of one embodiment. In block 400, an I/O card performs a DMA read or DMA write (hereinafter collectively "DMA transaction"). In block 402, the IOC splits the DMA transaction into cache line-sized requests to memory. In block 404, a determination is made whether the fetch limit, which may be equal to the total number of cache lines in the cache or to a subset of the total number of cache lines in the cache, has been reached. In one implementation, the fetch limit may be programmable such that it can be any value up to the total number of cache lines. If the fetch limit has been reached, execution proceeds to block 406, in which a determination is made whether the number of pending memory requests has fallen below the fetch limit. Execution remains in block 406 until a positive determination is made, at which point execution proceeds to block 408. In block 408, arbitration among all pending DMA transactions is performed in a fair manner. It will be recognized that the subject arbitration can be performed in accordance with any number of recognized arbitration schemes.

In block 410, a determination is made whether the DMA transaction issued in block 400 has "won" the arbitration. If not, execution returns to block 406; otherwise, execution proceeds to block 412. In block 412, the IOC issues a memory request. In block 414, a determination is made whether all memory requests for the DMA transaction have been issued. If not, execution proceeds to block 415, in which the next memory request for the current DMA transaction is evaluated, and then returns to block 416. If a positive determination is made in block 414, execution proceeds to block 416, in which a determination is made that all memory requests for the current DMA transaction have been issued.

It will be recognized that the flowchart illustrated in FIG. 4 illustrates only how DMA transactions are processed in accordance with an embodiment. The sequence of events that are executed when the requested data is returned from main memory to the cache is outside the scope of the embodiments described herein and therefore will not described in greater detail.

An implementation of the embodiments described herein thus provides method and system for cache utilization by limiting the number of pending cache line requests to the total number of cache lines or a subset of the cache. The embodiments shown and described have been characterized as being illustrative only; it should therefore be readily understood that various changes and modifications could be made therein without departing from the scope of the present invention as set forth in the following claims.

What is claimed is:

1. A memory utilization method in a computer system, the method comprising:
   receiving requests from a plurality of entities, wherein the requests are cache line-sized memory requests;
   determining whether a number of pending requests is less than a fetch limit that is equal to a number of cache lines of a cache memory;
   responsive to a determination that the number of pending requests is less than the fetch limit, performing an arbitration among all of the received requests; and
   processing the received request that wins the arbitration.

2. The method of claim 1 further comprising, responsive to a determination that the number of pending requests is greater than or equal to the fetch limit, waiting until the number of pending requests falls below the fetch limit.

3. The method of claim 1 wherein the cache memory is an input/output ("I/O") cache memory.

4. The method of claim 1 wherein the cache memory is a coherent cache memory.

5. The method of claim 1 wherein the requests comprise a portion of a DMA read request from an I/O device.

6. The method of claim 1 wherein the requests comprise a portion of a DMA write request from an I/O device.

7. A memory utilization method in a computer system, the method comprising:
   receiving DMA transactions from a plurality of entities;
   dividing the DMA transactions into a number of new cache line-sized memory requests;
   determining whether a number of pending memory requests is less than the total number of cache lines of a cache memory;
   responsive to, a determination that the number of pending memory requests is less than the total number of cache lines of the cache memory, performing an arbitration among the new cache line-sized memory requests; and
   responsive to completing the arbitration, issuing one of the new cache line-sized memory requests that wins the arbitration.

8. The method of claim 7 further comprising, responsive to a determination that the number of pending memory requests Is not less than the total number of cache lines of the cache memory, waiting until the number of pending memory requests falls below the total number of cache lines of the cache memory.

9. The method of claim 7 wherein the cache memory is an input/output ("I/O") cache memory.

10. The method of claim 7 wherein the cache memory is a coherent cache memory.

11. The method of claim 7 wherein the DMA transactions comprise a DMA read request.

12. The method of claim 7 wherein the DMA transactions comprise a DMA write request.

13. A system for performing DMA transactions in a computer, the system comprising:
   cache means for storing data in connection with DMA transactions;
   means for receiving requests from a plurality of entities, wherein the requests are cache line-sized memory requests;
   means for determining whether a number of pending requests is less than a fetch limit, wherein the fetch limit is equal to a number of lines of the cache means;
   means responsive to a determination that the number of pending requests is less than the fetch limit for performing an arbitration among all of the received requests; and
   means for processing the received request that wins the arbitration.

14. The system of claim 13 further comprising means responsive to a determination that the number of pending requests is not less than the fetch limit for waiting until the number of pending requests falls below the fetch limit.

15. The system of claim 13 wherein the cache means is an input/output ("I/O") cache memory.

16. The system of claim 13 wherein the cache means is a coherent cache memory.

17. The system of claim 13 wherein the requests comprise a portion of a DMA read request from an I/O device.

18. The system of claim 13 wherein the requests comprise a portion of a DMA write request from an I/O device.

19. A memory utilization system in a computer, the system comprising:
   means for receiving DMA transactions from a plurality of entities;
   means for dividing DMA transactions into a number of new cache line-sized memory requests;
   means for determining whether a number of pending memory requests is less than the total number of cache lines of a cache memory;
   means responsive to a determination that the number of pending memory requests is less than the total number of cache lines of the cache memory for performing an arbitration among the new cache line-sized memory requests; and
   means for issuing the memory request that wins the arbitration.

20. The system of claim 19 further comprising means responsive to a determination that the number of pending memory requests is not less than the total number of cache lines of the cache memory for waiting until the number of pending memory requests falls below the total number of cache lines of the cache memory.

21. The system of claim 19 wherein the cache memory is an input/output ("I/O") cache memory.

22. The system of claim 19 wherein the cache memory is a coherent cache memory.

23. A computer-readable medium operable with a computer for performing DMA transactions in a computer, the medium having stored thereon:
   instructions executable by the computer for receiving requests from a plurality of entities;
   instructions executable by the computer for determining whether a number of pending requests is less than a fetch limit, wherein the fetch limit is equal to a number of lines of a cache means;
   instructions executable by the computer responsive to a determination that the number of pending requests is less than the fetch limit for performing an arbitration among all of the received requests; and
   instructions executable by the computer for processing the received request that wins the arbitration.

24. The medium of claim 23 further having stored thereon instructions executable by the computer responsive to a determination that the number of pending requests is not less than the fetch limit for waiting until the number of pending requests falls below the fetch limit.

* * * * *

UNITED STATES PATENT AND TRADEMARK OFFICE
CERTIFICATE OF CORRECTION

| | |
|---|---|
| PATENT NO. | : 7,328,310 B2 |
| APPLICATION NO. | : 11/049454 |
| DATED | : February 5, 2008 |
| INVENTOR(S) | : John William Bockhaus |

Page 1 of 1

It is certified that error appears in the above-identified patent and that said Letters Patent is hereby corrected as shown below:

In column 9, line 19, in Claim 7, after "to" delete ",".

In column 9, line 28, in Claim 8, delete "Is" and insert -- is --, therefor.

Signed and Sealed this

Tenth Day of June, 2008

JON W. DUDAS
*Director of the United States Patent and Trademark Office*